(12) United States Patent
Jang

(10) Patent No.: US 7,577,115 B2
(45) Date of Patent: Aug. 18, 2009

(54) APPARATUS AND METHOD FOR ACQUIRING CODE GROUP IN ASYNCHRONOUS W-CDMA SYSTEM

(75) Inventor: Woo Jin Jang, Seoul (KR)

(73) Assignee: SKY Teletech Co., Ltd., Seoul (KR)

( * ) Notice: Subject to any disclaimer, the term of this patent is extended or adjusted under 35 U.S.C. 154(b) by 612 days.

(21) Appl. No.: 11/285,943

(22) Filed: Nov. 23, 2005

(65) Prior Publication Data

US 2006/0114942 A1 Jun. 1, 2006

(30) Foreign Application Priority Data

Nov. 25, 2004 (KR) ............... 10-2004-0097330

(51) Int. Cl.
*H04B 7/216* (2006.01)

(52) U.S. Cl. .................. 370/320; 370/342; 370/350; 375/148; 375/149

(58) Field of Classification Search ........... 370/503, 370/513, 484, 479, 320, 350, 342; 375/149, 375/148
See application file for complete search history.

(56) References Cited

U.S. PATENT DOCUMENTS

| | | | | |
|---|---|---|---|---|
| 6,185,244 | B1 * | 2/2001 | Nystrom et al. | 375/145 |
| 6,205,168 | B1 * | 3/2001 | Somayazulu | 375/149 |
| 6,571,099 | B1 * | 5/2003 | Kim et al. | 455/442 |
| 6,717,930 | B1 * | 4/2004 | Sezgin et al. | 370/335 |
| 6,728,297 | B2 * | 4/2004 | Rudolf | 375/145 |
| 6,990,091 | B2 * | 1/2006 | Sarkar | 370/342 |
| 7,061,967 | B2 * | 6/2006 | Schelm et al. | 375/147 |
| 7,102,994 | B2 * | 9/2006 | Sezgin et al. | 370/209 |

(Continued)

FOREIGN PATENT DOCUMENTS

GB 2368753 A * 5/2002

(Continued)

OTHER PUBLICATIONS

Caini, C., et al. "Initial Synchronization procedure in S-UMTS Networks for Multimedia Broadcast Multicast Services," Personal, Indoor and Mobile Radio Communications, 2002. The 13th IEEE International Symposiumon Sep. 15-18, 2002, Piscataway, NJ, USA, IEEE, vol. 1, Sep. 15, 2002 pp. 295-299, XP010614234.

(Continued)

*Primary Examiner*—Ricky Ngo
*Assistant Examiner*—Dewanda Samuel
(74) *Attorney, Agent, or Firm*—H.C. Park & Associates, PLC

(57) ABSTRACT

Provided are an apparatus and a method for acquiring a code group that is used for a mobile communication terminal to acquire a scrambling code for identification of a base station. The present invention compares a part of slot values in code groups of the secondary synchronization channel transmitted to a mobile communication terminal from a base station with a part of code groups already known and, when there is a code group having a value higher than a predetermined value, reads code groups having the same pattern as that of the code group having a value higher than the predetermined value, which are previously stored in a predetermined storage. Then, the present invention excludes the read code groups from operations to reduce the quantity of unnecessary operations.

5 Claims, 5 Drawing Sheets

U.S. PATENT DOCUMENTS

| | | | |
|---|---|---|---|
| 7,110,782 B2 * | 9/2006 | Yamaguchi | 455/502 |
| 7,126,981 B2 * | 10/2006 | Ho et al. | 375/147 |
| 7,142,526 B1 * | 11/2006 | Hokao | 370/331 |
| 7,158,505 B2 * | 1/2007 | Dick et al. | 370/350 |
| 7,187,707 B2 * | 3/2007 | Ho et al. | 375/145 |
| 7,224,718 B2 * | 5/2007 | Chang et al. | 375/145 |
| 7,386,006 B2 * | 6/2008 | Rimi et al. | 370/464 |
| 2001/0028677 A1 * | 10/2001 | Wang et al. | 375/148 |
| 2002/0150188 A1 * | 10/2002 | Rudolf | 375/354 |
| 2004/0142712 A1 * | 7/2004 | Rudolf | 455/502 |
| 2004/0228393 A1 * | 11/2004 | Chen et al. | 375/150 |

FOREIGN PATENT DOCUMENTS

| | | |
|---|---|---|
| WO | 2368753 | 5/2002 |
| WO | WO02/49229 A2 | 6/2002 |
| WO | WO03/003460 A1 | 4/2003 |

OTHER PUBLICATIONS

International Search Report dated Oct. 8, 2007 from corresponding European Patent Application No. 05257261.7.

* cited by examiner

PRIOR ART

| Scrambling code group | Slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group0 | 1 | 1 | 2 | 8 | 9 | 10 | 15 | 8 | 10 | 16 | 2 | 7 | 15 | 7 | 16 |
| Group1 | 1 | 1 | 5 | 16 | 7 | 3 | 14 | 16 | 3 | 10 | 5 | 12 | 14 | 12 | 10 |
| Group2 | 1 | 2 | 1 | 15 | 5 | 5 | 12 | 16 | 6 | 11 | 2 | 16 | 11 | 15 | 12 |
| Group3 | 1 | 2 | 3 | 1 | 8 | 6 | 5 | 2 | 5 | 8 | 4 | 4 | 6 | 3 | 7 |
| Group4 | 1 | 2 | 16 | 6 | 6 | 11 | 15 | 5 | 12 | 1 | 15 | 12 | 16 | 11 | 2 |
| Group5 | 1 | 3 | 4 | 7 | 4 | 1 | 5 | 5 | 3 | 6 | 2 | 8 | 7 | 6 | 8 |
| Group6 | 1 | 4 | 11 | 3 | 4 | 10 | 9 | 2 | 11 | 2 | 10 | 12 | 12 | 9 | 3 |
| Group7 | 1 | 5 | 6 | 6 | 14 | 9 | 10 | 2 | 13 | 9 | 2 | 5 | 14 | 1 | 13 |
| Group8 | 1 | 6 | 10 | 10 | 4 | 11 | 7 | 13 | 16 | 11 | 13 | 6 | 4 | 1 | 16 |
| Group9 | 1 | 6 | 13 | 2 | 14 | 2 | 6 | 5 | 5 | 13 | 10 | 9 | 1 | 14 | 10 |
| Group10 | 1 | 7 | 8 | 5 | 7 | 2 | 4 | 3 | 8 | 3 | 2 | 6 | 6 | 4 | 5 |
| Group11 | 1 | 7 | 10 | 9 | 16 | 7 | 9 | 15 | 1 | 8 | 16 | 8 | 15 | 2 | 2 |
| Group12 | 1 | 8 | 12 | 9 | 9 | 4 | 13 | 16 | 5 | 1 | 13 | 5 | 12 | 4 | 8 |
| Group13 | 1 | 8 | 14 | 10 | 14 | 1 | 15 | 15 | 8 | 5 | 11 | 4 | 10 | 5 | 4 |
| Group14 | 1 | 9 | 2 | 15 | 15 | 16 | 10 | 7 | 8 | 1 | 10 | 8 | 2 | 16 | 9 |
| Group15 | 1 | 9 | 15 | 6 | 16 | 2 | 13 | 14 | 10 | 11 | 7 | 4 | 5 | 12 | 3 |
| Group16 | 1 | 10 | 9 | 11 | 15 | 7 | 6 | 4 | 16 | 5 | 2 | 12 | 13 | 3 | 14 |
| Group17 | 1 | 11 | 14 | 4 | 13 | 2 | 9 | 10 | 12 | 16 | 8 | 5 | 3 | 15 | 6 |
| Group18 | 1 | 12 | 12 | 13 | 14 | 7 | 2 | 8 | 14 | 2 | 1 | 13 | 11 | 8 | 11 |
| Group19 | 1 | 12 | 15 | 5 | 4 | 14 | 3 | 16 | 7 | 8 | 6 | 2 | 10 | 11 | 13 |
| Group20 | 1 | 15 | 4 | 3 | 7 | 6 | 10 | 13 | 12 | 5 | 14 | 16 | 8 | 2 | 11 |
| Group21 | 1 | 16 | 3 | 12 | 11 | 9 | 13 | 5 | 6 | 2 | 14 | 7 | 4 | 10 | 15 |
| Group22 | 2 | 2 | 5 | 10 | 16 | 11 | 3 | 10 | 11 | 8 | 5 | 13 | 3 | 13 | 8 |
| Group23 | 2 | 2 | 12 | 3 | 15 | 5 | 8 | 3 | 5 | 14 | 12 | 9 | 8 | 9 | 14 |
| Group24 | 2 | 3 | 6 | 16 | 12 | 16 | 3 | 13 | 13 | 6 | 7 | 9 | 2 | 12 | 7 |
| Group25 | 2 | 3 | 8 | 2 | 9 | 15 | 14 | 3 | 14 | 9 | 5 | 5 | 15 | 8 | 12 |
| Group26 | 2 | 4 | 7 | 9 | 5 | 4 | 9 | 11 | 2 | 14 | 5 | 14 | 11 | 16 | 16 |
| Group27 | 2 | 4 | 13 | 12 | 12 | 7 | 15 | 10 | 5 | 2 | 15 | 5 | 13 | 7 | 4 |
| Group28 | 2 | 5 | 9 | 9 | 3 | 12 | 8 | 14 | 15 | 12 | 14 | 5 | 3 | 2 | 15 |
| Group29 | 2 | 5 | 11 | 7 | 2 | 11 | 9 | 4 | 16 | 7 | 16 | 9 | 14 | 14 | 4 |
| Group30 | 2 | 6 | 2 | 13 | 3 | 3 | 12 | 9 | 7 | 16 | 6 | 9 | 16 | 13 | 12 |
| Group31 | 2 | 6 | 9 | 7 | 7 | 16 | 13 | 3 | 12 | 2 | 13 | 12 | 9 | 16 | 6 |

Fig.2a

PRIOR ART

| Group | | | | | | | | | | | | | | |
|---|---|---|---|---|---|---|---|---|---|---|---|---|---|---|
| Group32 | 2 | 7 | 12 | 15 | 2 | 12 | 4 | 10 | 13 | 15 | 13 | 4 | 5 | 5 | 10 |
| Group33 | 2 | 7 | 14 | 16 | 5 | 9 | 2 | 9 | 16 | 11 | 11 | 5 | 7 | 4 | 14 |
| Group34 | 2 | 8 | 5 | 12 | 5 | 2 | 14 | 14 | 8 | 15 | 3 | 9 | 12 | 15 | 9 |
| Group35 | 2 | 9 | 13 | 4 | 2 | 13 | 8 | 11 | 6 | 4 | 6 | 8 | 15 | 15 | 11 |
| Group36 | 2 | 10 | 3 | 2 | 13 | 16 | 8 | 10 | 8 | 13 | 11 | 11 | 16 | 3 | 5 |
| Group37 | 2 | 11 | 15 | 3 | 11 | 6 | 14 | 10 | 15 | 10 | 6 | 7 | 7 | 14 | 3 |
| Group38 | 2 | 16 | 4 | 5 | 16 | 14 | 7 | 11 | 4 | 11 | 14 | 9 | 9 | 7 | 5 |
| Group39 | 3 | 3 | 4 | 6 | 11 | 12 | 13 | 6 | 12 | 14 | 4 | 5 | 13 | 5 | 14 |
| Group40 | 3 | 3 | 6 | 5 | 16 | 9 | 15 | 5 | 9 | 10 | 6 | 4 | 15 | 4 | 10 |
| Group41 | 3 | 4 | 5 | 14 | 4 | 6 | 12 | 13 | 5 | 13 | 6 | 11 | 11 | 12 | 14 |
| Group42 | 3 | 4 | 9 | 16 | 10 | 4 | 16 | 15 | 3 | 5 | 10 | 5 | 15 | 6 | 6 |
| Group43 | 3 | 4 | 16 | 10 | 5 | 10 | 4 | 9 | 9 | 16 | 15 | 6 | 3 | 5 | 15 |
| Group44 | 3 | 5 | 12 | 11 | 14 | 5 | 11 | 13 | 3 | 6 | 14 | 6 | 13 | 4 | 4 |
| Group45 | 3 | 6 | 4 | 10 | 6 | 5 | 9 | 15 | 4 | 15 | 5 | 16 | 16 | 9 | 10 |
| Group46 | 3 | 7 | 8 | 8 | 16 | 11 | 12 | 4 | 15 | 11 | 4 | 7 | 16 | 3 | 15 |
| Group47 | 3 | 7 | 16 | 11 | 4 | 15 | 3 | 15 | 11 | 12 | 12 | 4 | 7 | 8 | 16 |
| Group48 | 3 | 8 | 7 | 15 | 4 | 8 | 15 | 12 | 3 | 16 | 4 | 16 | 12 | 11 | 11 |
| Group49 | 3 | 8 | 15 | 4 | 16 | 4 | 8 | 7 | 7 | 15 | 12 | 11 | 3 | 16 | 12 |
| Group50 | 3 | 10 | 10 | 15 | 16 | 5 | 4 | 6 | 16 | 4 | 3 | 15 | 9 | 6 | 9 |
| Group51 | 3 | 13 | 11 | 5 | 4 | 12 | 4 | 11 | 6 | 6 | 5 | 3 | 14 | 13 | 12 |
| Group52 | 3 | 14 | 7 | 9 | 14 | 10 | 13 | 8 | 7 | 8 | 10 | 4 | 4 | 13 | 9 |
| Group53 | 5 | 5 | 8 | 14 | 16 | 13 | 6 | 14 | 13 | 7 | 8 | 15 | 6 | 15 | 7 |
| Group54 | 5 | 6 | 11 | 7 | 10 | 8 | 5 | 8 | 7 | 12 | 12 | 10 | 6 | 9 | 11 |
| Group55 | 5 | 6 | 13 | 8 | 13 | 5 | 7 | 7 | 6 | 16 | 14 | 15 | 8 | 16 | 15 |
| Group56 | 5 | 7 | 9 | 10 | 7 | 11 | 6 | 12 | 9 | 12 | 11 | 8 | 8 | 6 | 10 |
| Group57 | 5 | 9 | 6 | 8 | 10 | 9 | 8 | 12 | 5 | 11 | 10 | 11 | 12 | 7 | 7 |
| Group58 | 5 | 10 | 10 | 12 | 8 | 11 | 9 | 7 | 8 | 9 | 5 | 12 | 6 | 7 | 6 |
| Group59 | 5 | 10 | 12 | 6 | 5 | 12 | 8 | 9 | 7 | 6 | 7 | 8 | 11 | 11 | 9 |
| Group60 | 5 | 13 | 15 | 15 | 14 | 8 | 6 | 7 | 16 | 8 | 7 | 13 | 14 | 5 | 16 |
| Group61 | 9 | 10 | 13 | 10 | 11 | 15 | 15 | 9 | 16 | 12 | 14 | 13 | 16 | 14 | 11 |
| Group62 | 9 | 11 | 12 | 15 | 12 | 9 | 13 | 13 | 11 | 14 | 10 | 16 | 15 | 14 | 16 |
| Group63 | 9 | 12 | 10 | 15 | 13 | 14 | 9 | 14 | 15 | 11 | 11 | 13 | 12 | 16 | 10 |

Fig.2b

APPARATUS AND METHOD FOR ACQUIRING CODE GROUP IN ASYNCHRONOUS W-CDMA SYSTEM

CROSS REFERENCE TO RELATED APPLICATION

This application claims priority from and the benefit of Korean Patent Application No. 10-2004-0097330, filed on Nov. 25, 2004, which is hereby incorporated by reference for all purposes as if fully set forth herein.

BACKGROUND OF THE INVENTION

1. Field of the Invention

The present invention relates to an apparatus and a method for acquiring a code group in an asynchronous wideband code division multiple access (W-CDMA) system, and more particularly, to an apparatus and a method for acquiring a code group that is used for a mobile communication terminal to acquire a scrambling code for identification of a base station.

2. Background of the Related Art

Respective base stations in the asynchronous W-CDMA system use different codes, and even though a code used in one base station is shifted, the code does not become a code used in another base station, unlike a synchronous system. The structure of a synchronization channel used in this W-CDMA system is illustrated in FIG. 1.

FIG. 1 illustrates the structure of the synchronization channel proposed as a standard in the W-CDMA system. Referring to FIG. 1, the synchronization channel in the W-CDMA system consists of a primary synchronization channel (P-SCH) used in slot timing synchronization, that is, informing the starting point of each slot, and a secondary synchronization channel (S-SCH) used in acquiring frame timing synchronization and deciding a main scrambling code group corresponding to main scrambling codes used in base stations.

In the W-CDMA system, one frame structure in the synchronization channel contains 38400 chips in the whole of 10 milliseconds (3.84 MHz), and consists of 15 slots.

The P-SCH is sent during the front 256 chips of each slot (2560 chips), and same codes are sent to each slot, and thus slot timing synchronization is achieved. In this case, slot timing synchronization means informing the starting point of the slot.

The S-SCH is sent during the front 256 chips of each slot (2560 chips). However, one of 16 codes that are different one another is sent to each slot. That is, secondary synchronization code (SSC) values of the S-SCH received can be known through a search process of the S-SCH, and the code group of the received code can be known. SSC values of the secondary synchronization channel code groups are illustrated in FIGS. 2a and 2b.

A search process of the S-SCH according to the conventional technique will be described hereinafter with reference to FIG. 1.

Each base station uses one of 512 main scrambling codes, and cell search means that the mobile communication terminal grasps the main scrambling code in order to identify the base station that controls the cell to which the mobile communication terminal belongs. In the meantime, it takes a lot of time to grasp the main scrambling code at one time. Thus, a code group including 8 main scrambling codes, out of 512 (0~511) main scrambling codes, is decided first. That is, one code group consists of 8 main scrambling codes and so 512 main scrambling codes are divided into 64 code groups, and a base station belongs to one of these code groups, and the main scrambling code of the base station is decided after the code group is decided thus. Out of 64 code groups in all, where the base station belongs to is decided first, and then one of 8 main scrambling codes corresponding to one code group is decided.

Further, search process of the S-SCH is the process that decides where the S-SCH, received from the base station, belongs to out of 64 code groups. Because frame timing synchronization for informing the starting point of the frame is not achieved yet, 960 (64*15) cases, in which L slots (L=0, 1, 2, 3, 14) are shifted for each code group of 64, can become candidates for code group acquisition and frame timing synchronization. The code group of S-SCH received by a mobile communication terminal and the whole of 960 candidates are compared one another, and thus the candidate that gives the maximum energy value is decided. Further, correlation value with the secondary synchronization channel received is obtained for 15 slot values in each candidate. That is, correlation value is obtained for a length of 256 chips out of one slot value, and thus correlation value operations are needed 256*15 times (256 chips*15 slots) for each candidate.

Therefore, in the conventional method for acquiring a code group as stated above, correlation operations are needed 3,686,400 times as seen in the numerical formula below in order to compare the whole of 960 candidates, and thus many operations are needed. Consequently, a lot of time and power are required in cell search.

960*256 chips*15 slots=3,686,400

To overcome the above problems, two methods that cut down the time required for acquiring the code group have been proposed. One is that only a part of 15 slots for the whole of 960 candidates is operated first, and then the whole of 15 slots are operated for only the possible candidates. The other is that SSC values of 15 slots of the S-SCH received from the base station are known first, and then the preceding processing is done on the basis of the values. However, these methods have a problem that they did not make full use of characteristics of SSC values of the code groups already known.

SUMMARY OF THE INVENTION

Accordingly, the present invention has been made to solve the above problems occurring in the prior art, and it is an object of the present invention is to provide an apparatus and a method for acquiring a code group by doing correlation operation for only a part of code group candidates when a mobile communication terminal acquires a scrambling code for identification of a base station.

Another object of the present invention is to provide an apparatus and a method for acquiring a code group that can support prompt cell search in case of hand-off by promptly acquiring a code group used for a mobile communication terminal to acquire a scrambling code of a base station.

A further object of the present invention is to provide an apparatus and a method for acquiring a code group that can prevent a battery from being consumed for identification of the base station in case of cell change by promptly acquiring a code group of the synchronization channel received from the base station in a mobile communication terminal.

To accomplish the above objects, according to the present invention, there is provided an apparatus for acquiring a code group in an asynchronous W-CDMA system, comprising: a primary synchronization channel search unit that achieves slot timing synchronization of a received primary synchronization channel; a secondary synchronization channel search unit that starts correlation operation between a predetermined number of slots of a received secondary synchronization channel and a predetermined number of code group candidates according to the synchronization channel slot timing synchronization achieved by the primary synchronization channel search unit and, when there is a code group candidate having a value exceeding a predetermined threshold, sends information about the code group candidate to a selector; the selector sending the code group candidate value received from the secondary synchronization channel search unit to a storage unit, receiving code group candidates having the same secondary synchronization code characteristic as that of the code group candidate value from the storage unit, and directly transmitting the received code group candidates to a code group acquiring unit without passing them to the secondary synchronization channel search unit; the storage unit storing code group candidates according to the secondary synchronization code characteristic, and sending the code group candidates having the same secondary synchronization code characteristic as that of the code group candidate transmitted through the selector among the stored code group candidates to the selector and the secondary synchronization channel search unit; and the code group acquiring unit selecting the code group candidate having the maximum correlation characteristic from the code group candidates received from the selector.

To accomplish the above objects, according to the present invention, there is provided a method for acquiring a code group in an asynchronous W-CDMA system, comprising: a first step of achieving slot timing synchronization of the primary synchronization channel received by a primary synchronization channel search unit; a second step of starting correlation operation between a predetermined number of slots of a received secondary synchronization channel and a predetermined number of code group candidates according to the synchronization channel slot timing synchronization achieved in the first step and, when there is a code group candidate having a value exceeding a predetermined threshold, sending information about the code group candidate to a selector; a third step of sending the code group candidate value received from a secondary synchronization channel search unit to a storage unit, receiving code group candidates having the same secondary synchronization code characteristic as that of the code group candidate value from the storage unit, and directly transmitting the received code group candidates to a code group acquiring unit without passing them to the secondary synchronization channel search unit; a fourth step of sending code group candidates having the same secondary synchronization code characteristic as that of the code group candidate transmitted through the selector among code group candidates stored in the storage unit according to the secondary synchronization code characteristic to the selector and the secondary synchronization channel search unit; and a fifth step of acquiring unit selecting the code group candidate having the maximum correlation characteristic from the code group candidates received from the selector.

The present invention having the aforementioned configuration is for judging and acquiring a code group in an asynchronous W-CDMA system. The present invention compares a part of slot values in code groups of the secondary synchronization channel transmitted to a mobile communication terminal from a base station with a part of code groups already known and, when there is a code group having a value higher than a predetermined value, reads code groups having the same pattern as that of the code group having a value higher than the predetermined value, which are previously stored in a predetermined storage. Then, the present invention excludes the read code groups from operations to reduce the quantity of unnecessary operations. Accordingly, the number of code groups to be compared for correlation operations is remarkably decreased. The present invention intelligently uses characteristics of code groups already known to considerably reduce the time required for acquiring the code group, compared to the conventional method that sequentially compares all of code groups or compares a part of slot values of code group candidates and tracks candidates having values exceeding a threshold. Therefore, unnecessary power consumption is prevented such that the power of a battery of a mobile communication terminal is not unnecessarily consumed. Furthermore, prompt cell search can be supported in case of hand-off.

In the case of asynchronous W-CDMA system, in general, different scrambling codes are allocated to respective base stations. Thus, a mobile communication terminal acquires the scrambling code allocated to a base station controlling a cell to which the mobile communication terminal belongs in order to find the base station whenever the cell is changed. Before acquiring this scrambling code, a code group must be acquired first. That is, the present invention is for reducing the time required for acquiring this code group.

Among the conventional code acquiring methods, the method that operates only a part of 15 slots of 960 code group candidates and then operates the whole of 15 slots of only the possible candidates did not make full use of characteristics of the secondary synchronization code values of code groups already known. Thus, this method should carry out operations for all the 960 candidates in order to select candidates having values exceeding the threshold even only for a part of the 15 slots. The code group acquiring method proposed by the present invention makes full use of the characteristics of the secondary synchronization code values to obtain results of operations done for all the 960 candidates even when the operations are not actually carried out for the 960 candidates. The code group acquiring method of the present invention performs full operation for 15 slots of only the candidates having values exceeding a predetermined threshold, which have passed through the aforementioned process, to acquire the code group.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 2a and 2b are views showing secondary synchronization code values of the secondary synchronization channel code groups used in a W-CDMA system;

DETAILED DESCRIPTION OF THE PREFERRED EMBODIMENT

Reference will now made in detail to the preferred embodiment of the present invention with reference to the attached drawings.

Figure 1:
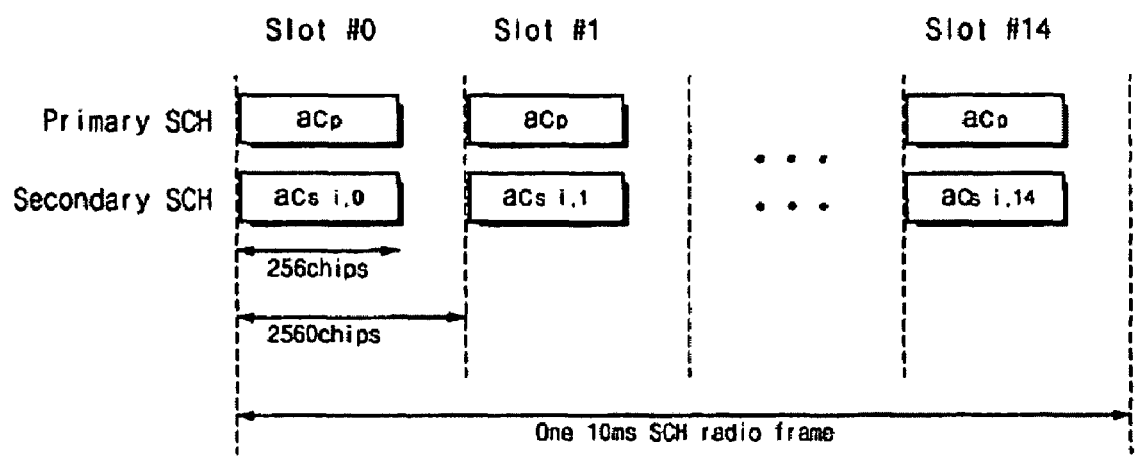
FIG. 1 is a view showing the structure of the synchronization channel used in a W-CDMA system.
Figure 3:
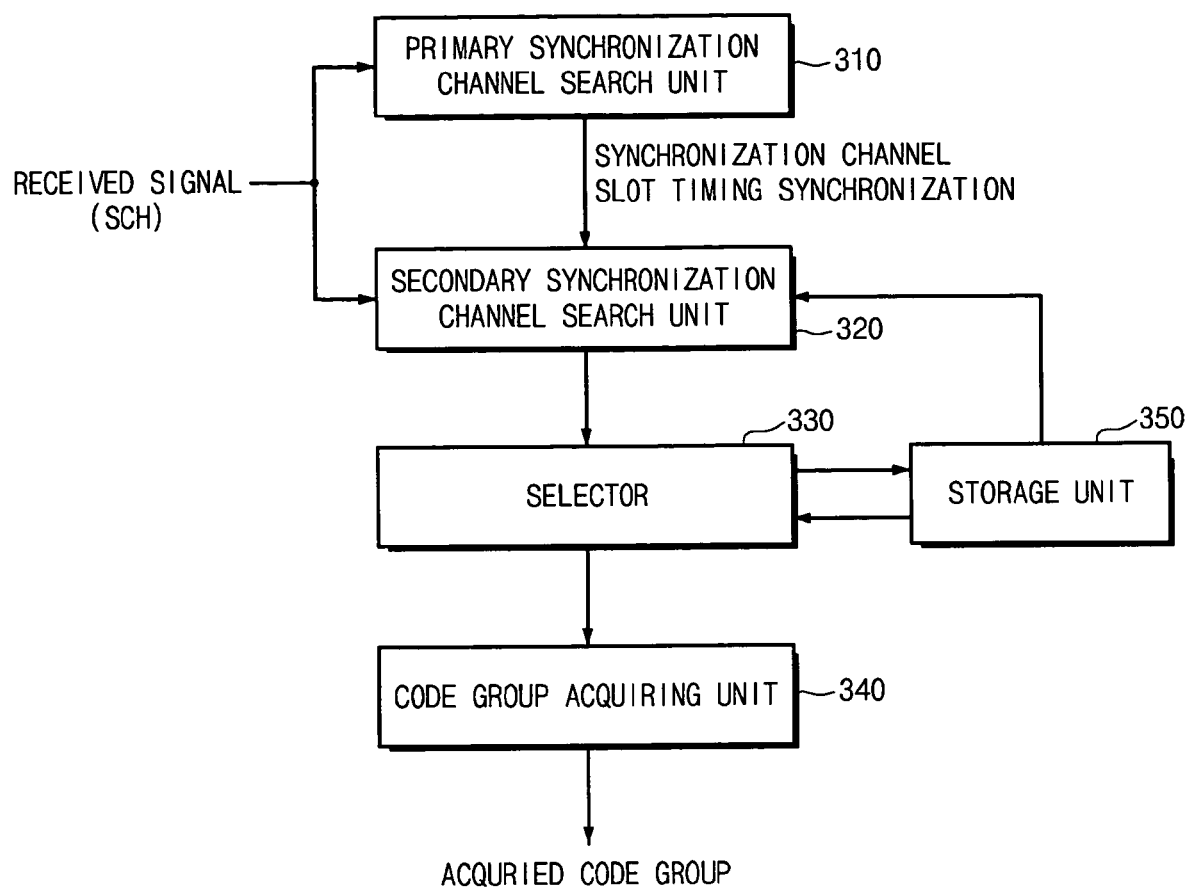
FIG. 3 is a block diagram of an apparatus for acquiring a code group in an asynchronous W-CDMA system according to an embodiment of the present invention.

FIG. 3 is a block diagram of an apparatus for acquiring a code group in an asynchronous W-CDMA system according to an embodiment of the present invention. Referring to FIG. 3, the code group acquiring apparatus of the present invention includes a primary synchronization channel search unit 310, a secondary synchronization channel search unit 320, a selector 330, a storage unit 350, and a code group acquiring unit 340.

Here, code group candidates having the same secondary synchronization code characteristic are set in the storage 350 with reference to secondary synchronization code values in response to the number of slots set in consideration of the number of the whole code group candidates and channel environment.

The operation of the code group acquiring apparatus according to the present invention having the aforementioned configuration will now be explained in detail.

A synchronization channel incoming from a base state passes through the primary synchronization channel search unit 310 to achieve synchronization channel slot timing synchronization. Correlation operation between K slots of the secondary synchronization channel received by the secondary synchronization channel search unit 320 and predetermined code group candidates is started (even for the code group candidates, the correlation operation is carried out for K slots of them). When there is a code group candidate having a value that exceeds a predetermined threshold, information (represented by (M,N) for convenience because there is a case where up to 15th slot of 64 code groups are shifted. Here, M is a code group number and N is the number of shifted times) about the candidate is sent to the selector 330. The selector 330 sends this code group candidate value to the storage unit 350 and receives values (M,N) having the secondary synchronization code characteristic, which have K slots identical to those of the code group candidate. These values (M,N) are directly sent to the code group acquiring unit 340 without passing through the secondary synchronization channel search unit 320. The storage unit 350 sends the values (M,N) having the same secondary synchronization code characteristic to the secondary synchronization channel search unit 320 to exclude the code group candidates corresponding to the values (M,N) from correlation operations. Thus, the quantity of operations carried out in the secondary synchronization channel search unit 320 is remarkably reduced.

Finally, the code group acquiring unit 340 selects a code group candidate having the maximum correlation characteristic from the code group candidates received from the selector 330.

For example, in cases where the secondary synchronization code values are started with 3 and 7 when only two slots are compared (that is, K=2), these cases include (3, 13), (20, 3), (46, 0) and (47, 0) among 960 code group candidates. If the code group candidate (3, 13) is selected by the secondary synchronization channel search unit 320, the selector 330 transmits this information to the storage unit 350. The storage unit 350 sends the other code group candidates (20, 3), (46, 0) and (47,0) having the same secondary synchronization code values started with 3 and 7 to the code group acquiring unit 340 via the selector 330 such that operations are carried out for 15 slots.

And, the storage unit 350 sends the code group candidates (20,3), (46,0) and (47,0) to the secondary synchronization channel search unit 320 to exclude them from the operations, thereby remarkably reducing the quantity of operations carried out in the secondary synchronization channel search unit 320.

Conventional techniques include the method that compares 15 slots of respective 960 candidates, and a method that operates only a part of 15 slots of all the 960 code group candidates and then operates 15 slots of only the possible candidates. However, these conventional methods do not make full use of characteristics of the secondary synchronization code values of certain code groups and require a large quantity of operations, long search time and power consumption. The present invention overcomes this problem and proposes a method of making full use of the characteristics of the secondary synchronization code values of the code groups to remarkably decrease the quantity of unnecessary operations, thereby reducing cell search time and power consumption.

The present invention is compared to a conventional technique to find out how much the quantity of operations is reduced by the present invention.

The latest conventional method that operates only a part of 15 slots of all the 960 code group candidates and then operates 15 slots of only the possible candidates is compared to the present invention. This conventional technique carries out correlation operation of all the code group candidates and the received secondary synchronization channel. How much the quantity of operations for code group candidates can be reduced by using the method proposed by the present invention is explained below.

The number of slots, K, for which the second synchronization channel search unit 320 carries out operations, can be decided by the number of code groups and channel environment. Assuming that 64 code groups and values shifted 15 times maximum decide other code group candidates in W-CDMA environment. When K=2, the first two secondary synchronization code values include 1 through 16 so that all the 960 code group candidates will belong to 256 patterns, obtained by multiplying 16 by 16 (16*16). That is, 3.75 code group candidates belong to one pattern as represented by the following numerical formula.

$$960 \div 256 = 3.75$$

Since about three or four code group candidates are distributed for one pattern (it is apparent that the number of code group candidates approximates to this value because there are considerably large number of secondary synchronization code values of the code group candidates and the secondary synchronization code values are randomly distributed), the secondary synchronization channel search unit 320 does not need to operate two or three code group candidates when it carries out operations for one pattern.

That is, the present invention uses the storage unit 350 storing these patterns and the selector 330 to remarkably reduce the quantity of operations of the secondary synchronization channel search unit 320 to ⅓ to ¼ of the quantity of operations carried out by the conventional method. The aforementioned example corresponds to the case that the number of the code group candidates is 960 and the number of the secondary synchronization code values is 16. Even if the number of the code group candidates and the number of the secondary synchronization code values are changed in an improved system, the quantity of operations can be largely reduced by appropriately deciding the value K and using the storage unit 350 and the selector 330.

Accordingly, the entire cell search time and power consumed by a terminal can be remarkably decreased compared to the conventional method because the operations of the secondary synchronization channel search unit 320 require long cell search time and large power consumption.

The process of acquiring a code group according to the present invention will now be explained.

Figure 4:
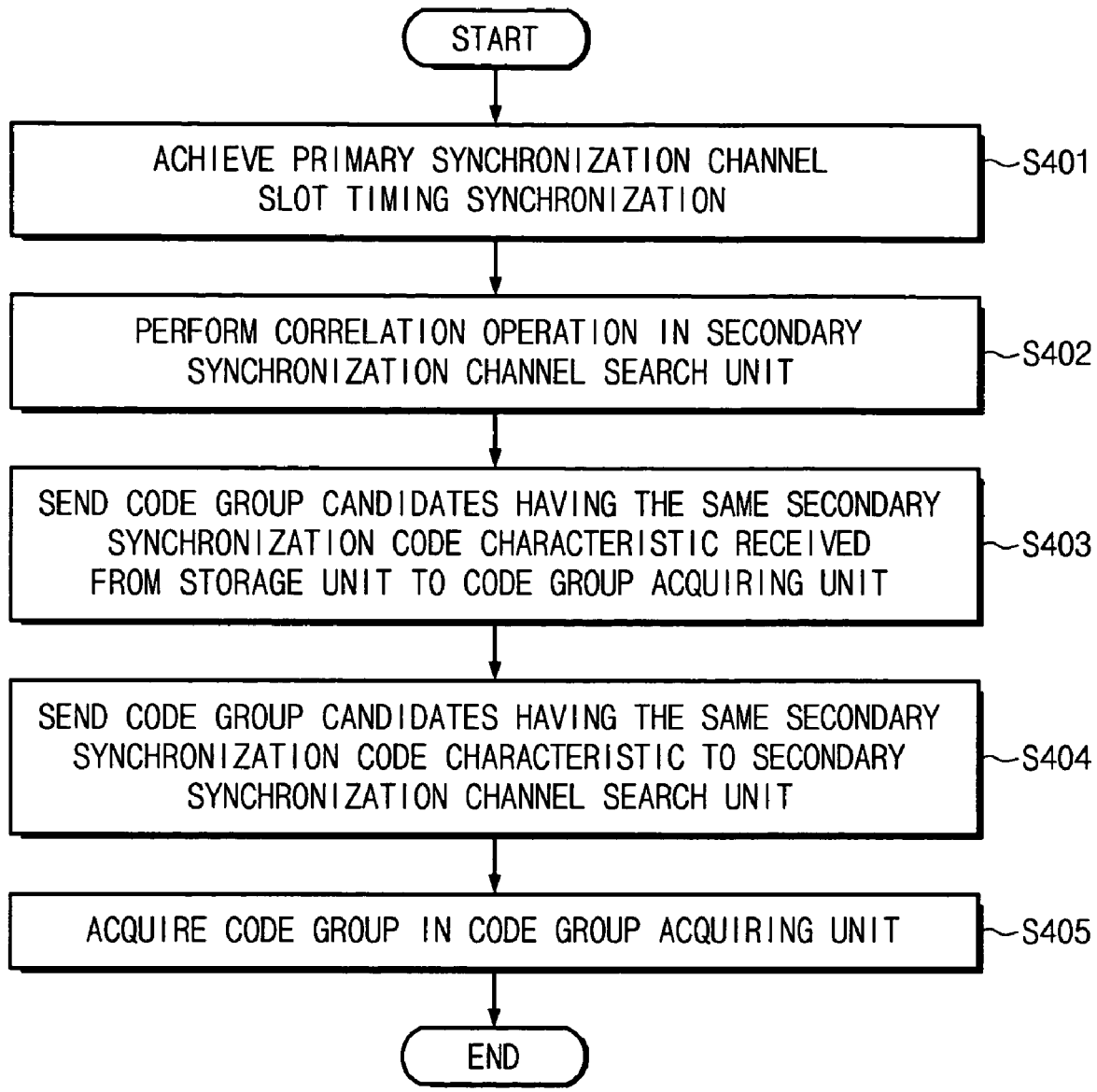
FIG. 4 is a flow chart of a method for acquiring a code group in an asynchronous W-CDMA system according to one embodiment of the present invention.

FIG. 4 is a flow chart of a method for acquiring a code group in an asynchronous W-CDMA system according to one embodiment of the present invention. Referring to FIG. 4, slot timing synchronization of the primary synchronization channel received from the primary synchronization channel search unit 310 is achieved in the step S401. According to slot timing synchronization of the synchronization channel, carried out in the step S401, the secondary synchronization channel search unit 320 starts correlation operation between a predetermined number of slots of the received secondary synchronization channel and a predetermined number of code group candidates and, when there is candidate having a value that exceed a predetermined threshold, sends information about this candidate to the selector 330 in the step S402.

The selector 330 sends the code group candidate value received from the secondary synchronization channel search unit 320 to the storage unit 350, receives code group candidates values having the same secondary synchronization code characteristic as that of the code group candidate received from the secondary synchronization channel search unit 320 from the storage unit 350, and directly transmits the received code group candidates to the code group acquiring unit 340 without passing them to the secondary synchronization channel search unit 320 in the step S403.

The storage unit 350 sends code group candidates having the same secondary synchronization code characteristic as those of the code group candidates transmitted through the selector 330 among the code group candidates stored according to the secondary synchronization code characteristic to the selector 330 and the secondary synchronization channel search unit 320 in the step S404.

The code group candidate having the maximum correlation characteristic is selected from the code group candidates received from the selector 330 in the step S405.

As described above, the present invention makes full use of characteristics of the secondary synchronization code values of code groups when acquiring a code group in an asynchronous W-CDMA system to remarkably reduce the required for acquiring the code group, support prompt cell search in case of hand-off, and prevent battery power from being unnecessarily consumed for identification of a base station in case of cell change.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for acquiring a code group in an asynchronous W-CDMA system, comprising:
   a primary synchronization channel search unit to achieve slot timing synchronization of a received primary synchronization channel;
   a secondary synchronization channel search unit to start a correlation operation between a predetermined number of slots of a received secondary synchronization channel and a predetermined number of code group candidates according to the synchronization channel slot timing synchronization, and if there is a first code group candidate having a secondary synchronization code characteristic exceeding a predetermined threshold, to send information about the first code group candidate to a selector;
   the selector to send the information about the first code group candidate to a storage unit, to receive a second code group candidate having the same secondary synchronization code characteristic as the first code group candidate from the storage unit, and to directly transmit the first code group candidate and the second code group candidate to a code group acquiring unit without passing the second code group candidate to the secondary synchronization channel search unit;
   the storage unit to store code group candidates according to the secondary synchronization code characteristic, and to send the second code group candidate to the selector and to the secondary synchronization channel search unit; and
   the code group acquiring unit to acquire the code group having a maximum correlation characteristic from among the first and second code group candidates received from the selector,
   wherein the second code group candidate is sent from the storage unit to the secondary synchronization channel search unit so that a correlation operation by the secondary synchronization channel search unit is not carried out for the second code group candidate.

2. The apparatus of claim 1, wherein the predetermined number of slots is set according to the predetermined number of code group candidates and a channel environment.

3. A method for acquiring a code group in an asynchronous W-CDMA system, comprising:
   achieving slot timing synchronization of a primary synchronization channel received by a primary synchronization channel search unit;
   starting a correlation operation between a predetermined number of slots of a received secondary synchronization channel and a predetermined number of code group candidates according to the synchronization channel slot timing synchronization, and if there is a first code group candidate having a secondary synchronization code characteristic exceeding a predetermined threshold, sending information about the first code group candidate to a selector;
   sending the information about the first code group candidate to a storage unit, receiving a second code group candidate having the same secondary synchronization code characteristic as the first code group candidate from the storage unit, and directly transmitting the first code group candidate and the second code group candidate to a code group acquiring unit without passing the second code group candidate to the secondary synchronization channel search unit;
   sending the second code group candidate to the secondary synchronization channel search unit; and
   acquiring the code group having a maximum correlation characteristic from among the first and second code group candidates received from the selector,
   wherein the second code group candidate is sent to the secondary synchronization channel search unit so that a correlation operation by the secondary synchronization channel search unit is not carried out for the second code group candidate.

4. The method of claim 3, wherein the predetermined number of slots is set according to the predetermined number of code group candidates and a channel environment.

5. The method of claim 4, wherein a third code group candidate having the same secondary synchronization code characteristic is stored in the storage unit and used if required.

* * * * *

UNITED STATES PATENT AND TRADEMARK OFFICE
CERTIFICATE OF CORRECTION

PATENT NO. : 7,577,115 B2  Page 1 of 1
APPLICATION NO. : 11/285943
DATED : August 18, 2009
INVENTOR(S) : Woo Jin Jang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 880 days.

Signed and Sealed this

Seventh Day of September, 2010

David J. Kappos
*Director of the United States Patent and Trademark Office*